United States Patent Office 3,457,285
Patented July 22, 1969

3,457,285
11-SUBSTITUTED, 16α,17α-DIFLUOROMETHYL-ENE STEROIDS OF THE PREGNANE SERIES
Colin C. Beard, Boulder, Colo., and Alexander D. Cross, Mexico City, Mexico, assignors to Syntex Corporation, Panama, Panama, a corporation of Panama
No Drawing. Continuation-in-part of application Ser. No. 486,226, Sept. 9, 1965. This application Sept. 23, 1966, Ser. No. 581,453
Int. Cl. C07c *169/30, 173/00, 169/34*
U.S. Cl. 260—397.45        23 Claims

ABSTRACT OF THE DISCLOSURE

16α,17α-difluoromethylenepregn-4-ene derivatives substituted at C–3 with keto, hydroxy, or esters and ethers thereof and at C–11 with keto, hydroxy, or chloro; optionally substituted at C–6 with methyl, fluoro, or chloro; at C–9 with fluoro or chloro; at C–16 with methyl; and at C–21 with fluoro, hydroxy, or the esters and ethers thereof; and optionally unsaturated between C–1, 2 and/or C–6, 7 are useful anti-inflammatories.

---

This is a continuation-in-part of copending application Ser. No. 486,226, filed Sept. 9, 1965, now U.S. Patent No. 3,338,928.

In particular, this invention pertains to cyclopentanophenanthrene derivatives.

Specifically, this invention pertains to substituted 16α, 17α-difluoromethylene steroids of the pregnane series which may be represented by the formula:

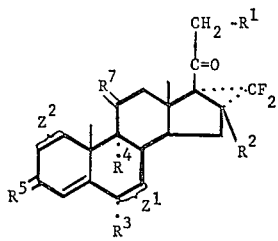

wherein each of $Z^1$ and $Z^2$ is a carbon-carbon single bond or a carbon-carbon double bond;

$R^1$ is hydrogen, hydroxy, fluoro, hydrocarbon carboxylic acyloxy, tetrahydrofuran-2-yloxy or tetrahydropyran-2-yloxy;

$R^2$ is hydrogen or methyl;

$R^3$ is hydrogen, methyl, fluoro or chloro;

$R^4$ is hydrogen, fluoro or chloro;

$R^5$ is oxygen or the group

where $R^6$ is hydrogen, hydroxy, hydrocarbon carboxylic acyloxy, tetrahydrofuran-2-yloxy or tetrahydropyran-2-yloxy;

$R^7$ is oxygen or the group

where $R^8$ is hydroxy or chloro, $R^4$ being chloro when $R^8$ is chloro.

The compounds of the present invention possess anti-inflammatory properties and are useful in treatment of allergic diseases, collagen diseases, musculoskeletal diseases, skin diseases, and the like. The steroids may be administered by the conventional pharmacological forms such as orally topically, etc. An oral dosage unit in the range of about 0.001 mg. to about 10 mg. per kilogram of body weight is usually employed. These compounds may be administered in the usual forms such as powders, capsules, pellets, pills, solutions, syrups, and so forth. Topically, the compounds can be applied as powders, creams, ointments, solutions, aerosols, and so forth, containing about 0.001% to about 1% of the steroid with the remainder being an inert vehicle or combinations of inert vehicles. Optionally the steroid can be employed with other therapeutic agents.

The hydrocarbon carboxylic acyloxy groups of the steroids of the present invention contain less than 12 carbon atoms and are straight, branched, cyclic or cyclic-aliphatic chain structures. The structures may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, caproate, benzoate, trimethylacetate, t-butylacetate, phenoxyacetate, cyclopentylpropionate, aminoacetate, β - chloropropionate, adamantoate, and the like.

The compounds of the present invention are prepared in the following manner: a 20-keto-Δ¹⁶-steroid, is treated with an equivalent amount, and preferably an amount greater than an equivalent amount, of an alkali metal or alkaline earth metal salt of the acid of the formula

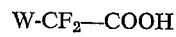

$$W\text{-}CF_2\text{—}COOH$$

in which W is chloro, bromo, or iodo. Typical examples of such acid salts include: sodium chlorodifluoroacetate, potassium iododifluoro acetate, etc. The reaction is carried out in an anhydrous, inert organic solvent of sufficient polarity to dissolve the reagent. Suitable solvents include: dimethyl diethylene glycol ether, 1,2-dimethoxyethane, dimethyl triethylene glycol ether, dioxane, tetrahydrofuran, dimethylformamide, dimethyl sulfoxide, and the like. The process is conducted at temperatures sufficient to decompose the reagent, which is evidenced by the evolution of $CO_2$ gas. As a rule, when sodium chlorodifluoroacetate is employed as a reagent, a temperature ranging from about 150° C. to about 180° C. is employed. The reaction time will vary depending upon the temperature, the amount of reagent used, the particular solvent used, and so forth. As a general rule, the reaction is completed within a period ranging from about 30 minutes to about 6 hours, but shorter or longer periods may be used. Optionally the reaction may be followed to completion by ultraviolet spectroscopy.

Under the conditions of the present process, hydroxy groups present on the starting material will be esterified, but these esterified hydroxy groups can be readily hydrolyzed with ethanolic potassium hydroxide, etc. Alternatively, the hydroxy groups can be protected prior to the process by esterification to hydrocarbon carboxylic acyloxy groups, or by etherification to tetrahydrofuran-2-yloxy or tetrahydropyran-2-yloxy groups.

At the completion of the process, the compounds may be isolated by conventional techniques. For example, the mixture is reduced to dryness, the residue is taken up in an inert organic solvent, immiscible with water, washed with water to neutrality, dried and reduced to dryness under vacuum to yield the product. The compound may be further purified by chromatography and/or recrystallization.

The 16-methyl-Δ¹⁶-steroid starting materials of the present invention are produced by treating 3,20-diketo-17α-hydroxy steroids with semicarbazide to produce the 3,20-bis-semicarbazone steroid. The steroid is treated with acetic anhydride in glacial acetic acid and then is allowed to react with an aqueous solution of pyruvic acid to yield the 3,20-diketo-Δ¹⁶-compound. This Δ¹⁶-steroid is then caused to react with diazomethane to produce the 16,17-pyrazoline steroid which is pyrolized to yield the 16-methyl-$\Delta^{16}$-steroid.

If the starting material possesses other unsaturation besides the $\Delta^{16}$-unsaturation, side reactions may occur with the reagent. In a preferred embodiment of the invention, such other unsaturation will be protected. For instance, a $\Delta^5$-steroid may be selectively halogenated with chlorine to produce the corresponding $5\alpha,6\beta$-dichloro steroid. The dichloro steroid can be dehalogenated after the principal reaction, for example, with zinc and glacial acetic acid to yield the unsaturated steroid.

The 3-hydroxy-$\Delta^5$-steroid can be converted into the 3-keto-$\Delta^4$-steroid by treating the former with aluminum isopropoxide in cyclohexanone. Alternatively, the $\Delta^4$-unsaturation and/or the $\Delta^1$-unsaturation and/or the $\Delta^6$-unsaturation can be introduced into the saturated steroids at this time.

The $\Delta^4$-unsaturation is introduced by treating the 3-keto steroid with bromine to yield the 3-keto-4-bromo steroid which yields the desired product upon debromination with lithium chloride. The $\Delta^1$-unsaturation is introduced by treating the 3-keto-$\Delta^4$-steroid with 2,3-dichloro-5,6-dicyano-1,4-benzoquinone or selenium dioxide. The duced by treating the 3-keto-$\Delta^4$-steroid with 2,3-dichloro-$\Delta^6$-unsaturation is introduced by treating the 3-keto-$\Delta^4$ or 3-keto-$\Delta^{1,4}$-steroid with chloranil.

The 6-chloro group is introduced by treating the 3-ethoxy-$\Delta^{3,5}$-steroid with N-chlorosuccinimide. The $6\beta$-chloro group is predominately formed, but this can be isomerized to the $6\alpha$-chloro group by treatment with hydrogen chloride at about 15° C. The 6-fluoro group is similarly introduced by using perchlorly fluoride as the reagent. The $9\alpha$-chloro and fluoro groups are introduced by treating the $9\beta,11\beta$-oxido steroids with either hydrogen chloride or hydrogen fluoride respectively. The $9\beta,11\beta$-oxido steroid is formed by treating the $11\beta$-steroid with mesylchloride in the presence of an organic base, and the resulting $\Delta^{9(11)}$-steroid is treated with N-bromoacetamide in the presence of perchloric acid, and then with potassium acetate to yield the desired product. The $9\alpha,11\beta$-dichloro steroid is prepared by treating the $\Delta^{9(11)}$-steroid with chlorine gas.

The 21-fluoro group is introduced by treating the 21-hydroxy steroid with methane sulfonyl chloride to yield the 21-methane sulfonate steroid, which yields the 21-iodo steroid when treated with sodium iodide. By treating the 21-iodo steroid with silver fluoride, the 21-fluoro steroid is produced. Alternatively, by treating the 21-iodo steroid with potassium acetate, the 21-acetoxy steroid is produced.

The 3-keto group present on the steroids may be converted into a $3\beta$-hydroxy group upon treatment with sodium borohydride under anhydrous conditions. The $3\beta$- and/or the 21-hydroxy steroids may be readily esterified by conventional techniques, such as with acetic anhydride in pyridine. The $3\beta$- and/or 21-(tetrahydrofuran-2-yloxy), and the $3\beta$- and/or 21-(tetrahydropyran-2-yloxy) steroids are prepared by treating the $3\beta$- and/or 21-hydroxy steroids with either dihydrofuran or dihydropyran respectively in the presence of an acid catalyst, such as p-toluenesulfonyl chloride.

In order that those skilled in the art may more fully understand the present invention, the following examples are set forth. The examples are intended to merely illustrate the present invention and in no way should they be construed as expressing a limitation thereof.

PREPARATION I

One gram of $17\alpha$-hydroxy-21-acetoxypregnane-3,11,20-trione is treated with 1.4 g. of semicarbazide hydrochloride in 30 ml. of methanol containing 1 ml. of water and 0.74 g. of sodium bicarbonate. The mixture is refluxed for 3 hours and then maintained at 45° C. for an additional 20 hours while under a nitrogen atmosphere. Fifty milliliters of water are added, and the 3,20-bis-semicarbazone steroid is collected by filtration, dried, dissolved in a solution of 20 ml. of acetic acid and 1 ml. of acetic anhydride and heated at reflux under nitrogen for 1 hour.

The solution is reduced to dryness and a solution of 1 g. of sodium borohydride, 15 ml. of methanol and 20 ml. of tetrahydrofuran is added to the residue and it is allowed to stand for 15 hours. The mixture is reduced to dryness after 3 ml. of acetic acid are added. The residue is diluted with water, extracted with ethyl acetate, dried and reduced to dryness. The residue is placed in 12 ml. of acetic acid and treated with 6 ml. of water and 3 ml. of pyruvic acid. The mixture is allowed to stand at room temperature for 40 hours and at 60° C. for 2 hours and is then diluted with water and extracted with chloroform. The extracts are washed with water, an aqueous 5% potassium bicarbonate solution and water, dried and evaporated to dryness. The $\Delta^{16}$-steroid is then placed in a solution of 2 ml. of acetic anhydride and 4 ml. of pyridine. After it is allowed to stand for 12 hours, the mixture is added to water, and the solid that forms is collected by filtration, washed and dried. The residue is dissolved in 10 ml. of ether, and a 10 ml. saturated ether solution of diazomethane is cautiously added to it. The mixture is evaporated to dryness, and the residue is gradually heated to 180° C. in vacuo, yielding $11\beta$-hydroxy-16-methyl-21-acetoxypregn-16-ene-3,20-dione.

In a similar manner, $6\alpha$-methyl-$17\alpha$-hydroxy-21-acetoxypregn-4-ene-3,11,20-trione is converted into $6\alpha,16$-dimethyl-21-acetoxypregna-4,16-diene-3,11,20 - trione. By omitting the diazomethane and pyrolysis treatment, $6\alpha$-methyl-21-acetoxypregna-4,16-diene-3,11,20-trione is obtained.

PREPARATION II

A mixture of 1 g. of $6\alpha$-methyl-$11\beta$-hydroxy-21-acetoxypregna-4,16-diene-3,20-dione, 25 ml. of benzene, 5 ml. of ethylene glycol and 50 mg. of p-toluenesulfonic acid is refluxed for 16 hours. The mixture is then washed with an aqueous sodium bicarbonate solution and water, dried and evaporated to dryness to yield 3,20-bisethylenedioxy-$6\alpha$-methyl-21-acetoxypregna-5,16-dien-$11\beta$-ol. The steroid is added to 15 ml. of chloroform, cooled to 0° C. and treated with 1.05 molar equivalents of chlorine. The mixture is allowed to reach 25° C.; then it is flushed with dry air, washed with aqueous sodium bicarbonte solution and water, dried, evaporated to dryness, and added to a solution of 50 ml. of acetone and 0.2 ml. of hydrochloric acid. After the mixture has stood for 15 hours, it is added to water and extracted with methylene chloride. The extracts are washed to neutrality, dried and evaporated to dryness to yield $5\alpha,6\beta$-dichloro-$6\alpha$-methyl-21-acetoxypregn-16-ene-3,11,20-trione.

Example I

To a stirred and refluxing solution of 1 g. of 3,20-bisethylenedioxy-6-methyl-21-acetoxypregna-5,16-dien - $11\beta$-ol in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 3,20-bisethylenedioxy-6-methyl - $16\alpha,17\alpha$ - difluoromethylenepregn-5-diene-21,$11\beta$-diol.

A mixture of 0.5 g. of 3,20-bisethylenedioxy-6-methyl-$16\alpha,17\alpha$- difluoromethylenepregn-5-ene-21,$11\beta$-diol in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate and evaporated to dryness, to yield $6\alpha$-methyl-$11\beta$,21- dihydroxy - 16α,17α - difluoromethylenepregn-4-ene-3,20-dione which may be recrystallized from acetone:hexane.

A mixture of 1 g. of 6α-methyl-11β,21-dihydroxy-16α,17α-difluoromethylenepregn-4-ene-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 6α-methyl-11β-hydroxy-16α,17α-difluoromethylene-21-acetoxypregn - 4 - ene - 3,20 - dione which may be further purified through recrystallization from acetone: hexane.

Example II

To a stirred and refluxing solution of 1 g. of 11β,21-dihydroxypregn-16-ene-3,20-dione in 10 ml. of dimethyl triethylene glycol ether, is added in a dropwise fashion and under nitrogen, a 50% w./v. solution of sodium chlorodifluoroacetate in the same solvent. When the addition of 5 equivalents of reagent fails to produce an appreciable change in the U.V. spectrum, the addition is stopped. The solution is cooled and filtered, and the filtrate is evaporated to dryness under reduced pressure. The residue thus obtained is chromatographed on alumina, eluting with methylene chloride, to yield 11β,21-bischlorodifluoroacetoxy - 16α,17α - difluoromethylene-pregnane-3,20-dione.

The product is then taken up in 50 ml. of methanol, cooled to 5° C., and then the resulting mixture is treated with a 5% solution of potassium hydroxide in 1 ml. of water. After 3 hours, the reaction mixture is then poured into ice water and the solid which forms is collected by filtration, washed with water to neutrality and dried to yield 11β,21-dihydroxy - 16α,17α - difluoromethylenepregnane-3,20-dione which is recrystallized from methylene chloride:ether.

In the same manner, 11α,21 - dihydroxy-16α,17α-difluoromethylene - 16β - methylpregnane-3,20-dione is prepared from 11β,21 - dihydroxy - 16 - methylpregn-16-ene-3,20-dione.

Example III

To a stirred solution of 1 g. of 11β,21-dihydroxy-16α,17α-difluoromethylene − 16β - methylpregnane-3,20-dione in 17 ml. of chloroform and 20 ml. of glacial acetic acid, cooled to −10° C., are added a few drops of a 15% solution of hydrogen bromide in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms and this material is then collected by filtration, washed with cold 1:1 water:dimethylformamide and then water and dried to yield 11β,21-dihydroxy-16α,17α-difluoromethylene-16β-methylpregn-4-ene-3,20-dione which is further purified through recrystallization from acetone with charcoal decolorization as necessary.

In a similar manner, other 3-keto-Δ⁴-steroids may be produced from 3-keto steroids. For example, 11β,21-dihydroxy - 16α,17α - difluoromethylenepregn-4-ene-3,20-dione is produced from the corresponding 3-keto steroid.

Example IV

To a suspension of 1 g. of 11β-hydroxy-16α,17α-difluoromethylene-21-acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 30 minutes. There is then added 0.8 ml. of pyridine, followed by water until solidifications occurs. This solid is collected by filtration, washed with water and air dried to yield 3-ethoxy-11β-hydroxy-16α,17α-difluoromethylene-21-acetoxypregna-3,5-dien-20-one which is recrystallized from acetone:hexane.

The product is added to a mixture of 0.4 g. of anhydrous sodium acetate, 20 ml. of acetone and 6 ml. of water. The solution is cooled to 5° C. and 1.1 molar equivalents of N-chlorosuccinimide and 0.4 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-11β-hydroxy-16α,17α-difluoromethylene-21-acetoxypregn-4-ene - 3,20 - dione which is recrystallized from acetone. The corresponding 6α-chloro compound is obtained by dissolving this compound in glacial acetic acid and introducing a slow stream of anhydrous hydrogen chloride over a period of four hours at a temperature of 15° C. The solid which forms upon pouring this mixture into water is collected by filtration, washed with water and dried to yield 6α-chloro-11β - hydroxy - 16α,17α - difluoromethylene - 21 - acetoxypregn-4-ene-3,20-dione which is recrystallized from acetone:hexane. Similarly the 6α-fluoro steroid may be prepared from the same starting material.

A stream of perchloryl fluoride is passed through a solution of 1 g. of 3-ethoxy-11β-hydroxy-16α,17α-difluoromethylene - 16β - methyl - 21 - acetoxypregna-3,5-diene-20-one in 25 ml. of dimethylformamide, cooled to 0° C., for 5 minutes. After being allowed to slowly attain a temperature of 20° C., the solution is poured into water and extracted with ethyl acetate. These extracts are washed with a saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this is passed a stream of dry hydrogen chloride for a period of 24 hours at a temperature of 15° C. The mixture is poured into cold water and the solid which forms is collected by filtration, washed with water and dried to yield 6α-fluoro-11β-hydroxy - 16α,17α - difluoromethylene-16β-methyl-21-acetoxypregn-4-ene-3,20-dione which is recrystallized from acetone:hexane.

Similarly, 6α - chloro - 11β - hydroxy-16α,17α-difluoromethylene - 16β - methyl - 21 - acetoxypregn - 4 - ene-3,20-dione and 6α-fluoro-11β-hydroxy-16α,17α-difluoromethylene-16β-methyl-21-acetoxypregn-4-ene-3,20-dione are prepared from the corresponding 3-keto-Δ⁴-steroids.

Example V

One gram of 6α-fluoro-11β,21-acetoxy-16α,17α-difluoromethylenepregn-4-ene-3,20-dione is dissolved with slow heating in 12.5 ml. of dimethylformamide. The mixture is cooled and 0.42 g. of methylchloride and 0.5 ml. of pyridine are added. The solution is heated at 80° C. for 30 minutes, then cooled, diluted with water and extracted with ethyl acetate. The extracts are washed with water, dried over sodium sulfate and evaporated to yield 6α-fluoro - 16α,17α - difluoromethylene-21-acetoxypregna-4,9(11)-diene-3,20-dione, which is added to a mixture of 10 ml. of pure dioxane and 0.16 ml. of 0.4 N perchloric acid.

Five hundred and sixty milligrams of N-bromoacetamide are added over a one hour period with stirring, in the dark and at room temperature, to the mixture; the reaction mixture is then stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution and water, and the solvent is then removed by distillation in vacuo. The residue is triturated with acetone to yield the bromohydrin intermediate.

A mixture of 0.4 g. of anhydrous potassium acetate and 4 ml. of acetone is heated almost to boiling and a solution of 0.34 g. of the bromohydrin intermediate, in 4 ml. of acetone, is then slowly added with stirring. The mixture is refluxed for 10 hours, cooled and almost all of the acetone is removed by distillation. Iced water is then added and the solid which forms is collected by filtration, washed with water and dried to yield 6α-fluoro-9β,11β-oxido-16α,17α - difluoromethylene - 21 - acetoxypregn - 4 - ene - 3,20-dione, which may be further purified through recrystallization from methylene chloride:hexane.

The product is dissolved in 30 ml. of methylene chloride, cooled to 0° C., and while being stirred, a cooled solution (−70° C.) of 2.11 g. of anhydrous hydrogen fluoride in 3.7 ml. of tetrahydrofuran is added over a period of 20 minutes. The mixture is stirred at a temperature below 10° C. for 6 hours and then neutralized by the cautious addition of 5% aqueous sodium bicarbonate solution. The organic layer is separated, washed with water, dried over sodium sulfate and concentrated until a solid forms. The cooled mixture is then filtered and the solid dissolved in hot ethyl acetate. This solution is filtered hot and then cooled and the solid which forms is collected by filtration to yield 6α,9α-difluoro-11β-hydroxy-16α,17α-difluoromethylene - 21 - actoxypregn - 4 - ene - 3,20 - dione. Alternatively the 9α-chlorosteroid can be formed from the same starting material.

To a stirred solution of 4 g. of 6α-fluoro-9β,11β-oxido-16α,17α - difluoromethylene - 21 - acetoxypregn - 4 - ene-3,20-dione in 40 ml. of anhydrous chloroform, hydrogen chloride gas is added over a period of 35 minutes and at 0° C. and then diluted with water. The organic layer is separated, washed with aqueous sodium bicarbonate solution and with water, dried over sodium sulfate and evaporated under reduced pressure to yield 6α-fluoro-9α-chloro - 11β - hydroxy - 16α,17α - difluoromethylene - 21-acetoxypregn-4-ene-3,20-dione.

By the above procedures, other 9α-chloro or fluoro steroids may be prepared. For example, 6α,9α-dichloro-11β - hydroxy - 16α,17α - difluoromethylene - 21 - acetoxypregn - 4 - ene - 3,20 - dione, 6α - chloro - 9α - fluoro-11β - hydroxy - 16α,17α - difluoromethylene - 21 - acetoxypregn - 4 - ene - 3,20 - dione; 6α,9α - difluoro - 11β-hydroxy - 16α,17α - difluoromethylene - 16β - methyl - 21-acetoxypregn - 4 - ene - 3,20 - dione; 9α - chloro - 11β-hydroxy -16α,17α - difluoromethylene - 16β - methyl - 21-acetoxypregn - 4 - ene-3,20-dione; 9α-fluoro-11β-hydroxy-16α,17α-difluoromethylene - 16β - methyl - 21 - acetoxypregn - 4 - ene - 3,20 - dione; 6α - methyl - 9α - chloro-11β - hydroxy-16α,17α - difluoromethylene-21 - acetoxypregn - 4 - ene - 3,20 - dione; 6α,16β - dimethyl - 9α-chloro - 11β - hydroxy - 16α,17α - difluoromethylene-21 - acetoxypregn -4 - ene - 3,20 - dione; and 6α,16β - dimethyl - 9α - fluoro - 11β - hydroxy - 16α,17α - difluoromethylene - 21 - acetoxypregn - 4 - ene - 3,20 - dione are prepared from the corresponding 3-keto-Δ⁴-steroids by the above appropriate procedure.

Example VI

To a stirred solution of 1.6 g. of 21-acetoxy-16α,17α-difluoromethylenepregna-4,9(11)-diene-3,20-dione and 4 ml. of chloroform, a solution of 0.3 g. of chlorine in 10 ml. of carbon tetrachloride is added over a 5 minute period with continuous stirring. After being allowed to stand at room temperature for 20 minutes, the mixture is treated with 10 ml. of 5% aqueous sodium carbonate solution and extracted with chloroform. The chloroform extracts are washed with water to neutrality, dried over sodium sulfate and evaporated to dryness to yield 9α, 11β - dichloro - 16α,17α - difluoromethylene - 21 - actoxypregn-4-ene-3,20-dione which may be recrystallized from acetone:hexane.

Other 9α,11β-dichloro steroids may be obtained by using the corresponding Δ⁹⁽¹¹⁾-steroids in the above procedure. For example, 6α,9α,11β-trichloro-16α,17α-difluoromethylene - 21 - acetoxypregn - 4 - ene - 3,20 - dione may be obtained from 6α-chloro-16α,17α-difluoromethylene - 21 - acetoxypregna - 4,9(11) - diene - 3,20 - dione by the method of this example.

Example VII

A mixture of 0.5 g. of 6α-chloro-11β,21-dihydroxy-16α,17α - difluoromethylenepregn - 4 - ene - 3,20 - dione, 10 ml. of dioxane, and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 6α - chloro - 11β,21 - dihydroxy - 16α,17α - difluoromethylenepregna-1,4-diene-3,20-dione which is further purified by recrystallization from acetone:hexane.

Similarly, 11β,21 - dihydroxy - 16α,17α - difluoromethylenepregna - 1,4 - diene - 3,20 - dione; 11β,21 - dihydroxy - 16α,17α - difluoromethylene - 16β - methylpregna-1,4 - diene - 3,20 - dione; 6α-fluoro - 11β,21 - dihydroxy-16α,17α - difluoromethylene - 16β - methylpregna - 1,4-diene - 3,20 - dione; 6α-methyl - 11β,21 - dihydroxy-16α, 17α - difluoromethylenepregna - 1,4 - diene - 3,20-dione; 9α - fluoro - 11β,21 - dihydroxy - 16α,17α - difluoromethylenepregna - 1,4 - diene - 3,20 - dione; 9α,11β-dichloro-16α,17α - difluoromethylene - 16β - methyl - 21-hydroxypregna - 1,4 - diene - 3,20 - dione; and 6α,9α-dichloro-16α,17α - difluoromethylene - 16β - methyl - 21-enepregna-1,4-diene-3,20-dione are prepared from the corresponding 3-keto-Δ⁴-steroids.

Example VIII

A mixture of 1 g. of 6α-fluoro-11β,21-dihydroxy-16α,17α-difluoromethylene - 16β - methylpregn - 4 - ene - 3,20-dione, 2 g. of chloranil, and 10 ml. of xylene is refluxed under an atmosphere of nitrogen for 16 hours. The mixture is cooled, washed with a cold 10% sodium hydroxide solution and then water, dried over sodium sulfate and evaporated under reduced pressure. The residue is chromatographed on neutral alumina and further purified through recrystallization from acetone:hexane to yield 6-fluoro - 11β,21 - dihydroxy - 16α,17α - difluoromethylene-16β-methylpregna-4,6-diene-3,20-dione.

11β,21 - dihydroxy - 16α,17α - difluoromethylenepregna-4,6 - diene - 3,20 - dione; 11β,21 - dihydroxy - 16α,17α-difluoromethylene - 16β - methylpregna - 4,6 - diene - 3, 20 - dione; 6 - fluoro - 11β,21 - dihydroxy - 16α,17α-difluoromethylenepregna - 4,6 - diene - 3,20 - dione; 6-methyl - 11β,21 - dihydroxy - 16α,17α - difluoromethylenepregna - 4,6 - diene - 3,20 - dione; 6,16β - dimethyl-11β,21 - dihydroxy - 16α,17α - difluoromethylenepregna-4,6 - diene - 3,20 - dione; 9α - fluoro - 11β,21 - dihydroxy-16α,17α - difluoromethylenepregna - 4,6 - diene - 3,20-dione; 9α - fluoro - 11β,21 - dihydroxy - 16α,17α - difluoromethylene - 16β - methylpregna - 4,6 - diene - 3,20-dione; 9α - fluoro - 11β,21 - dihydroxy - 16α,17α - difluoromethylene - 16β - methylpregna - 4,6 - diene - 3,20 - dione; 6,9α - difluoro - 11β,21 - dihydroxy - 16α,17α - difluoromethylenepregna - 4,6 - diene - 3,20 - dione; 6,9α-difluoro - 11β,21 - dihydroxy - 16α,17α - difluoromethylene - 16β - methylpregna - 4,6 - diene - 3,20 - dione; 6-methyl - 9α - fluoro - 11β,21 - dihydroxy - 16α,17α - difluoromethylenepregna - 4,6 - diene - 3,20 - dione; 6,16β-dimethyl - 9α - fluoro - 11β,21 - dihydroxy - 16α,17α-difluoromethylenepregna - 4,6 - diene - 3,20 - dione; and 9α,11β - dichloro - 11β,21 - dihydroxy - 16α,17α - difluoromethylenepregna-4,6-diene-3,20-dione are prepared in a like manner from the corresponding 3-keto-Δ⁴-steroids.

Example IX

To a cooled solution (0° C.) of 3.4 g. of 6α,9α-difluoro-11β,21 - dihydroxy - 16α,17α - difluoromethylenepregn - 4-ene-3,20-dione in 20 ml. of 9:1 chloroform:pyridine is added in small portion 1.4 g. of methanesulfonyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in 20 ml. of acetone which is treated at room temperature and under stirring with 4 g. of sodium iodide. Sodium thiosulfate solution is added to decolorize the mixture, followed by the addition of water. The solid which forms is collected by filtration and dried under vacuum to yield 6α,9α-difluoro-11β-hydroxy-16α,17α-difloromethylene-21 - iodopregnane - 3,20 - dione. This material is dissolved in 20 ml. of acetonitrile and treated in a dropwise fashion with 1.4 g. of silver fluoride in 3 ml. of water. The mixture is allowed to stand at room temperature for 24 hours and then is filtered. The filtrate is concentrated under vacuum and the solid which forms is collected and dried to yield 6α,9α,21-trifluoro-11β-hydroxy - 16α,17α - difluoromethylenepregn-4-ene-3,20-dione which is recrystallized from methanol:acetone.

Similarly, 11β - hydroxy-16α,17α-difluoromethylene-21-fluoropregn-4-ene-3,20-dione is prepared from 11β,21-dihydroxy-16α,17α - difluoromethylenepregn - 4 - ene - 3,20-dione.

Example X

A solution of 200 mg. of 9α,11β-dichloro-16α,17α-difluoromethylene - 16β - methyl-21-fluoropregna-4,6-diene-3,20-dione in 32 ml. of anhydrous isopropanol and 25 mg. of sodium borohydride is stirred at room temperature for 15 hours. One hundred ml. of water is added and the resulting suspension is extracted several times with ether. The ether phase is dried over sodium sulfate and evaporated to dryness under reduced pressure to yield 3β-hydroxy-9α,11β-dichloro-16α,17α - difluoromethylene - 16β-methyl-21-fluoropregna-4,6-dien-20-one which may be further purified by recrystallization from ether.

Similarly, 9α-fluoro-11β,21-dihydroxy-16α,17α,difluoromethylene-16β-methylpregna-1,4-diene-3,20-dione may be reduced to 3β,11β,21-trihydroxy-9α-fluoro-16α,17α-difluoromethylene-16β-methylpregna-1,4-dien-20-one.

Example XI

A mixture of 1 g. of 3β,11β-dihydroxy-16α,17α-difluoromethylene-21-fluoropregna-1,4-diene-20-one, 4 ml. of pyridine, and 2 ml. of acetic anhydride is allowed to stand at room temperature for 15 hours. The mixture is then poured into ice water and the solid which forms is collected by filtration, washed with water and dried to yield 3β-acetoxy-11β-hydroxy-16α, 17α-difluoromethylene-21-fluoropregna-1,4-dien-20-one which may be further purified recrystallization from acetone:hexane.

Similarly other 3β-acetoxy and/or 21-acetoxy steroids may be obtained from the corresponding 3β-hydroxy and/or 21-hydroxy steroids. For example, 3β,21-diacetoxy - 11β - hydroxy - 16α,17α-difluoromethylenepregn-4-en-20-one is produced from the corresponding 3β,21-dihydroxy steroid.

By using other other anhydrides in place of acetic anhydride, other acyloxy steroids are produced. For example in the above preparation, if caproic anhydride is used, 3β-caproxy-11β-hydroxy-16α,17α - difluoromethylene - 21-fluoropregna-1,4-diene-20-one is obtained.

Example XII

A mixture of 2 g. of 3β,11β-dihydroxy-6α,21-difluoro-16α,17α-difluoromethylenepregna-1,4-dien-20-one in 8 ml. of pyridine and 4 ml. of adamantoyl chloride is heated at steam bath temperatures for one hour. The mixture is then poured into ice water and the solid which forms is collected by filtration, washed with water and dried to yield 3β-adamantoyloxy-6α,21-difluoro-11β-hydroxy-16α,-17α-difluoromethylenepregn-1,4-diene-20-one which is further purified through recrystallization from methylene chloride:hexane.

Other 3β-hydroxy and/or 21-hydroxy steroids may be similarly esterified with adamantoyl chloride. For example, 3β,21-diadamantoyloxy-6-fluoro-11β-hydroxy-16α, 17α-difluoromethylenepregna-4,6-dien-20-one is prepared from 3β,11β,21-trihydroxy-6-fluoro-16α,17α-difluoromethylenepregna-4,6-dien-20-one.

Example XIII

Two milliliters of dihydropyran are added to a solution of 1 g. of 3β,11β,21-trihydroxy-16α,17α-difluoromethylene-16β-methylpregna-1,4,6-trien-20-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β,21-di(tetrahydropyran-2-yloxy) - 11β - hydroxy - 16α,17α - difluoromethylene-16β-methylpregna-1,4,6 trien-20-one which is recrystalized from pentane.

By using dihydrofuran in the procedure instead of dihydropyran, 3β,21 - di(tetrahydrofuran - 2-yloxy)-11β-hydroxy-16α,17α-difluoromethylene-16β-methylpregna-1,4,6-trien-20-one.

Similarly other 3β and/or 21-tetrahydropyran or furanyl ether steroids may be prepared from the corresponding 3β and/or 21-hydroxy steroids.

Example XIV

One gram of 6α-methyl-9α-fluoro-11β-hydroxy-16α,17α-difluoromethylene-21-acetoxypregn-4-ene-3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6α-methyl-9α-fluoro-11β,21-dihydroxy-16α,17α-difluoromethylenepregn-4-ene-3,20-dione which is collected by filtration and recrystallization from acetone:hexane.

Example XV

A mixture of 1 g. of 6α-methyl-16α,17α-difluoromethylene-21-acetoxypregn-4-ene-3,11,20-trione, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 3,20-bisethylenedioxy - 6α - methyl - 16α,17α - difluoromethylene - 21-acetoxypregn-4-en-11-one which is recrystallized from acetone:hexane.

A solution of 1 g. of 3,20-bisethylenedioxy-6α-methyl-16α,17α - difluoromethylene - 21 - acetoxypregn - 4 - en-11-one in 10 ml. of anhydrous tetrahydrofuran is cooled to 75° C. in a Dry Ice-acetone bath and treated with a previously cooled solution of 0.3 g. of lithium aluminum t-butoxide in 10 ml. of anhydrous tetrahydrofuran. After maintaining the reaction mixture at 75° C. for 1 hour and at room temperature for 30 minutes it is poured into ice water and extracted several times with ethyl acetate. These extracts are washed with water to neutrality, dried over anhydrous sodium sulfate and evaporated to dryness under vacuum. The residue is chromatographed and recrystallized from acetone:hexane to yield 3,20-bisethylenedioxy - 6α - methyl - 16α,17α - difluoromethylene - 21-acetoxypregn-4-en-11β-ol.

The steroid is then added to 25 ml. of acetone containing 0.1 ml. of concentrated hydrochloric acid. The mixture is allowed to stand for 15 hours then poured into water. The mixture is extracted with methylene chloride, and the extracts are washed to neutrality, dried and evaporated to dryness to yield 6α-methyl-11β-hydroxy-16α,17α - difluoromethylene - 21 - acetoxy - pregn - 4 - ene-3,20-dione.

In a similar manner, the 11-keto steriods of the previous examples can be reduced to the corresponding 11-hydroxy steroids.

For example, 6α,9α-difluoro-11β-hydroxy-16α,17α-difluoromethylene - 21 - acetoxypregna - 1,4 - diene - 3,20-dione is obtained from 6α,9α-difluoro-16α,17α-difluoromethylene-21-acetoxypregna-1,4-diene-3,11,20-trione.

What is claimed is:

1. Compounds of the formula:

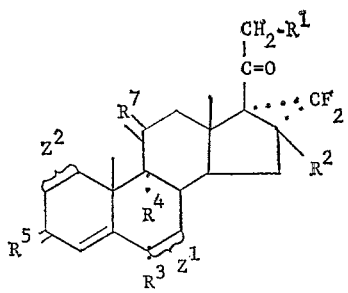

wherein each of $Z^1$ and $Z^2$ is a carbon-carbon bond or a carbon-carbon double bond;
$R^1$ is hydrogen, hydroxy, fluoro, hydrocarbon carboxylic acyloxy, tetrahydrofuran-2-yloxy or tetrahydropyran-2-yloxy;
$R^2$ is hydrogen or methyl;
$R^3$ is hydrogen, methyl, fluoro or chloro;
$R^4$ is hydrogen, fluoro or chloro;
$R^5$ is oxygen or the group

where $R^6$ is hydrogen, hydroxy, hydrocarbon carboxylic acyloxy, tetrahydrofuran-2-yloxy or tetrahydropyran-2-yloxy; and
$R^7$ is oxygen or the group

where $R^8$ is hydroxy or chloro, $R^4$ being chloro when $R^8$ is chloro.

2. Compounds according to claim 1 wherein $R^7$ is the group

3. Compounds according to claim 1 wherein $R^3$ is methyl, fluoro or chloro.

4. Compounds according to claim 1 wherein
$R^1$ is hydroxy, fluoro or acetoxy;
$R^2$ is hydrogen;
$R^3$ is hydrogen, fluoro or chloro;
$R^5$ is oxygen;
$R^7$ is the group
and

$Z^1$ is a carbon-carbon single bond.

5. Compounds according to claim 4 wherein
$R^3$ and $R^4$ are hydrogen; and
$Z^2$ is a carbon-carbon single bond.

6. Compounds according to claim 4 wherein
$R^3$ and $R^4$ are hydrogen; and
$Z^2$ is a carbon-carbon double bond.

7. Compounds according to claim 4 wherein
$R^1$ is hydroxy or acetoxy;
$R^3$ is hydrogen;
$R^4$ and $R^8$ are chloro; and
$Z^2$ is a carbon-carbon single bond.

8. Compounds according to claim 4 wherein
$R^1$ is hydroxy or acetoxy;
$R^3$ is hydrogen;
$R^4$ and $R^8$ are chloro; and
$Z^2$ is a carbon-carbon double bond.

9. Compounds according to claim 4 wherein
$R^1$ is hydroxy or acetoxy;
$R^3$ is fluoro;
$R^4$ and $R^8$ are chloro; and
$Z^2$ is a carbon-carbon single bond.

10. Compounds according to claim 4 wherein
$R^1$ is hydroxy or acetoxy;
$R^3$ is fluoro;
$R^4$ and $R^8$ are chloro; and
$Z^2$ is a carbon-carbon double bond.

11. The compound according to claim 4 wherein
$R^1$ is fluoro;
$R^3$ is hydrogen;
$R^4$ and $R^8$ are chloro; and
$Z^2$ is a carbon-carbon double bond.

12. The compound according to claim 4 wherein
$R^1$ and $R^3$ are fluoro;
$R^4$ and $R^8$ are chloro; and
$Z^2$ is a carbon-carbon double bond.

13. Compounds according to claim 4 wherein
$R^1$ is hydroxy or acetoxy;
$R^3$ and $R^4$ are hydrogen;
$R^8$ is hydroxy; and
$Z^2$ is a carbon-carbon single bond.

14. Compounds according to claim 4 wherein
$R^1$ is hydroxy or acetoxy;
$R^3$ and $R^4$ are hydrogen;
$R^8$ is hydroxy; and
$Z^2$ is a carbon-carbon double bond.

15. Compounds according to claim 4 wherein
$R^1$ is hydroxy or acetoxy;
$R^3$ is fluoro;
$R^4$ is hydrogen;
$R^8$ is hydroxy; and
$Z^2$ is a carbon-carbon single bond.

16. Compounds according to claim 4 wherein
$R^1$ is hydroxy or acetoxy;
$R^3$ is fluoro;
$R^4$ is hydrogen;
$R^8$ is hydroxy; and
$Z^2$ is a carbon-carbon double bond.

17. Compounds according to claim 4 wherein
$R^1$ is hydroxy or acetoxy;
$R^3$ is hydrogen;
$R^4$ is fluoro;
$R^8$ is hydroxy; and
$Z^2$ is a carbon-carbon single bond.

18. Compounds according to claim 4 wherein
$R^1$ is hydroxy or acetoxy;
$R^3$ is hydrogen;
$R^4$ is fluoro;
$R^8$ is hydroxy; and
$Z^2$ is a carbon-carbon double bond.

19. Compounds according to claim 4 wherein
$R^1$ is hydroxy or acetoxy;
$R^3$ and $R^4$ are fluoro;
$R^8$ is hydroxy; and
$Z^2$ is a carbon-carbon single bond.

20. Compounds according to claim 4 wherein
$R^1$ is hydroxy or acetoxy;
$R^3$ and $R^4$ are fluoro;
$R^8$ is hydroxy; and
$Z^2$ is a carbon-carbon double bond.

21. Compounds according to claim 1 wherein
$R^1$ is hydroxy, fluoro or acetoxy
$R^3$ is methyl;
$R^5$ is oxygen;
$R^7$ is the group

and $Z^1$ is a carbon-carbon single bond.

22. A compound according to claim 21 wherein $R^1$ is acetoxy;

$R^2$ is hydrogen;

$R^4$ is hydrogen;

$R^8$ is hydroxy; and $Z^2$ is a carbon-carbon single bond.

23. A compound according to claim 21 wherein $R^1$ is acetoxy;

$R^2$ is hydrogen;

$R^4$ is fluoro;

$R^8$ is hydroxy; and $Z^2$ is a carbon-carbon double bond.

References Cited

UNITED STATES PATENTS 3,232,961   2/1966   Kaspar et al. _____ 260—397.3

HENRY A. FRENCH, Primary Examiner

U.S. Cl. X.R.

260—239.55, 397.3, 999

UNITED STATES PATENT OFFICE
CERTIFICATE OF CORRECTION

Patent No. 3,457,285          Dated July 22, 1969

Inventor(s) Colin C. Beard and Alexander D. Cross

It is certified that error appears in the above-identified patent and that said Letters Patent are hereby corrected as shown below:

Column 11, line 29, between the word "carbon" and "bond", should appear --single--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents